(No Model.)

L. HEWITT.
BACK BAND HOOK.

No. 325,931. Patented Sept. 8, 1885.

Witnesses:
Theodore L. Popp
Otto H. Kroh

Leslie Hewitt Inventor.
By Wilhelm Bonner
Attorneys

United States Patent Office.

LESLIE HEWITT, OF LOUISVILLE, KENTUCKY, ASSIGNOR OF ONE-HALF TO PRATT & LETCHWORTH, OF BUFFALO, NEW YORK.

BACK-BAND HOOK.

SPECIFICATION forming part of Letters Patent No. 325,931, dated September 8, 1885.

Application filed June 12, 1885. (No model.)

*To all whom it may concern:*

Be it known that I, LESLIE HEWITT, of Louisville, in the county of Jefferson and State of Kentucky, have invented new and useful Improvements in Back-Band Hooks, of which the following is a specification.

This invention relates to an improvement in the devices whereby chain-traces are attached to or supported on the back-band, and has for its object to so construct the supporting device that the chain-trace is securely held thereby against accidental displacement, while it can be readily detached therefrom without disconnecting the ends of the trace from the hame and single-tree or other parts to which it is attached.

My invention consists to that end of the improvements which will be hereinafter fully set forth, and pointed out in the claims.

Figure 1:
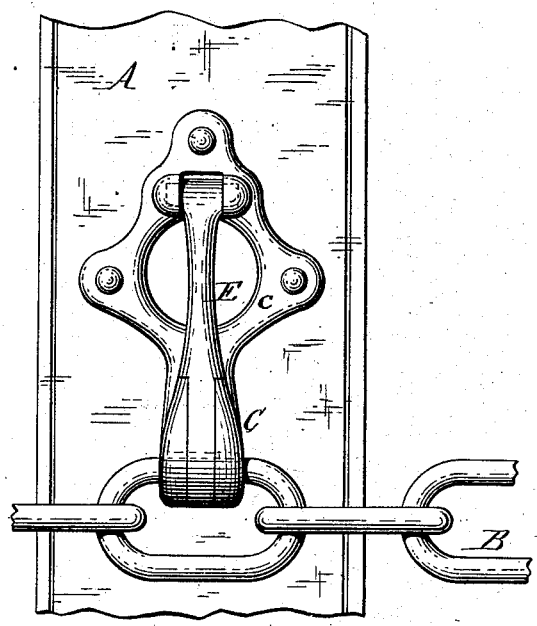
Figure 2:
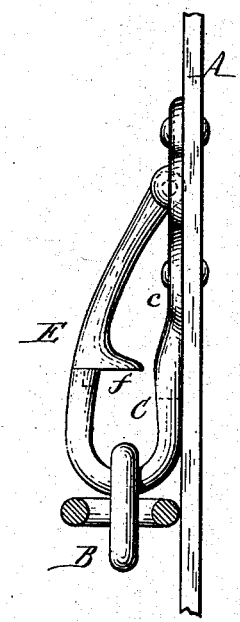
Figure 3:
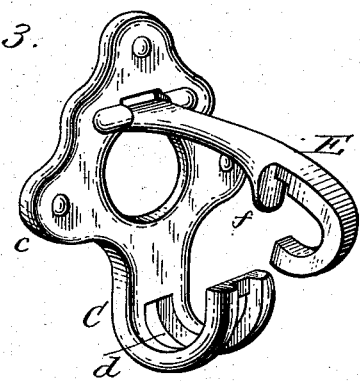

In the accompanying drawings, Figure 1 is a side elevation of my improved back-band hook. Fig. 2 is an elevation at right angles to Fig. 1. Fig. 3 is a perspective view of the hook.

Like letters of reference refer to like parts in the several figures.

A represents a portion of the back-band, and B a portion of the chain-trace.

C is a stationary supporting-hook provided at its upper end with a plate, $c$, by which it is riveted or otherwise secured to the back-band. This hook is curved outwardly and upwardly from the back-band, and its lower curved portion is provided with a slot, $d$, or made bifurcated, as may be preferred.

E is a movable guard-hook pivoted with its upper end to the plate $c$, and having its curved lower end or jaw shaped to enter the slot $d$ or between the two curved jaws of the stationary hook when closed down so that the interlocking jaws of the two hooks stand by side.

$f$ is an inwardly-projecting guard formed on the movable hook to prevent the chain-trace from rising so far in the hook as to permit the guard-hook to become disengaged from the stationary hook.

Upon placing a link of the chain-trace in the stationary hook and then closing the movable hook down upon the stationary hook, the jaw of the movable hook and the jaws of the stationary hook on both sides of the movable hook form a loop in which the chain-link is supported and securely held against displacement. The chain-link, resting on the jaws of both the stationary and movable hooks, holds both jaws together and prevents the movable hook from swinging away from the stationary hook.

When it is desired to detach the trace from the hook, the chain-link is raised in the hook above the inner end of the jaw of the movable hook E. The latter is then swung outward to clear the stationary hook and the chain is removed. By a reverse operation the chain is attached to the hook. In this manner the chain is securely held in place on the hook against accidental detachment, and at the same time enabled to be easily detached when required.

I claim as my invention—

1. In a back-band hook, the combination, with the stationary hook C, provided with an attachment whereby it is secured to the back-band, of the guard-hook E, pivoted to said attachment, both hooks being provided with jaws, substantially as described, which interlock side by side, whereby the movable hook is held in engagement with the stationary hook by the chain-links supported on the hooks, substantially as set forth.

2. The combination, with the stationary hook C, provided with a plate, $c$, and having its jaw constructed with a slot, $d$, of the guard-hook E, pivoted to the plate $c$, and having its jaw constructed to enter the slot $d$, substantially as set forth.

3. The combination, with the stationary hook C, provided with an attachment whereby it is secured to the back-band, of the hook E, pivoted to said attachment and provided with an inwardly-projecting guard, $f$, both hooks being constructed with jaws which interlock side by side when closed, substantially as set forth.

Witness my hand this 27th day of May, 1885.

LESLIE HEWITT.

Witnesses:
F. B. BARKLEY,
D. N. COMINGORE.